United States Patent [19]

Bertini

[11] 4,023,448
[45] May 17, 1977

[54] METHOD OF MAKING A SAW BLADE CONSTRUCTION

[76] Inventor: Milo Bertini, 679 Garden St., Trumbull, Conn. 06605

[22] Filed: Aug. 13, 1975

[21] Appl. No.: 604,431

[52] U.S. Cl. .................................. 76/112; 83/661
[51] Int. Cl.² .................................. B23D 63/00
[58] Field of Search .......... 76/101 R, 112; 83/661, 83/853, 846, 697, 794

[56] References Cited

UNITED STATES PATENTS

| 201,444 | 3/1878 | Pratt | 83/661 |
|---|---|---|---|
| 566,865 | 9/1896 | Morrish | 83/846 |
| 2,431,517 | 11/1947 | Stevens | 76/112 |
| 2,528,226 | 10/1950 | Hildebrant | 76/112 X |
| 2,710,501 | 6/1955 | Hull | 76/112 X |
| 3,295,400 | 1/1967 | Anderson | 83/661 |

FOREIGN PATENTS OR APPLICATIONS

| 2,875 | 2/1878 | Germany | 83/846 |
|---|---|---|---|
| 25,164 | 2/1907 | Sweden | 83/846 |
| 99,498 | 7/1940 | Sweden | 83/846 |

*Primary Examiner*—Al Lawrence Smith
*Assistant Examiner*—Nicholas P. Godici
*Attorney, Agent, or Firm*—Arthur T. Fattibene

[57] ABSTRACT

A method and construction of a saw blade whereby the ends of a saw blade are secured to define an endless saw blade construction which has a series of cutting teeth progressively arranged from leading to trailing end so that the respective teeth are rendered self-feeding. Each cutting tooth is formed with a relatively wide root which is inclined to define a clearance angle of 10° to 15°.

8 Claims, 7 Drawing Figures

METHOD OF MAKING A SAW BLADE CONSTRUCTION

PROBLEM & PRIOR ART

Heretofore, saw blades were commonly formed with cutting teeth having a 45° point wherein alternate teeth were laterally offset to the respective sides of the blade. Saw blades having teeth so formed cut by scratching a workpiece rather than by cutting. Such known saw blades required a considerable amount of pressure be applied to the saw blade for effecting a cut. Such pressure was detrimental to the life of the blade, as the applied pressure frequently caused the saw blade to twist and/or distort. When this occurred the accuracy of the cut effected there is adversely affected. Also, the geometry of conventional saw teeth was such that they were easily dulled and weakened.

OBJECTS

An object of this invention is to provide a saw blade construction and method of forming the same in which the respective teeth are progressively arranged along the length of a blade to render the respective teeth self-feeding.

Another object is to provide a saw blade construction which is capable of effecting a faster cut.

Another object is to provide a saw blade construction which requires a minimum of pressure to be applied thereto for effecting a cutting operation.

Another object is to provide a saw with an improved tooth configuration for enhancing the cutting and/or strength thereof.

Another object resides in the provision of a saw blade construction which enhances a cutting operation with little if any distortion of the blade.

Another object is to provide a saw blade construction which is capable of producing more work with less power than is currently possible with known saw blade constructions.

BRIEF SUMMARY OF INVENTION

The foregoing objects and other features and advantages are attained by a saw blade construction which comprises a saw blade having a series of cutting teeth spaced along the cutting edge thereof which are progressively sloped from leading to trailing end portions thereof so as to render the respective teeth self-feeding during a cutting operation. While such blade can be used as a straight saw blade, the same can be made endless by securing the leading and trailing end portions into connected abutting relationship. The respective teeth are formed with a relatively large inclined angle; e.g., 75°–80° to define a tooth having a broad or wide root and which is slightly tapered to define a clearance angle of 10° to 15°.

According to this invention an endless saw blade can be readily formed from an elongated blade. This is attained by disposing the leading and trailing end portions of the blade into an offset abutting relationship and securing the offset abutting ends together. The back end of the blade is then machined or ground to remove the excess offset portion so as to define a back edge which is coincidental to a common plane.

Another method of forming an endless saw blade embodying the invention is to form an elongated saw blade in which the blade tapers or diverges from the leading end to trailing end. An elongated blade so formed can then be formed into an endless blade by securing the leading and trailing end portions into abutting relationship with the back edges of the respective end portions being coincidentally disposed.

Other features and advantages will be more readily apparent when considered in view of the drawings and specification in which.

DETAILED DESCRIPTION

Figure 1:
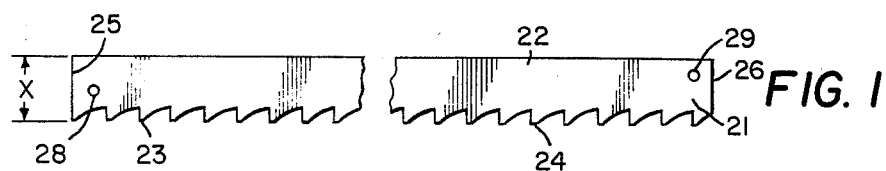
FIG. 1 is a side elevation view of a saw blade from which an endless blade may be formed embodying this invention, and/or which may be alternately utilized as a straight blade.
Figure 3:
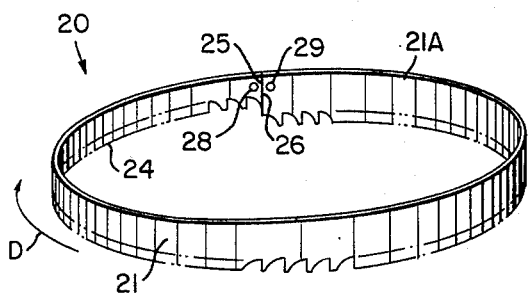
FIG. 3 is a perspective view of an endless saw blade embodying this invention.

Referring to the drawings, there is shown in FIG. 3 an improved endless saw blade 20 embodying the present invention. The saw blade 20 is defined by an elongated member 21, as shown in FIG. 1, which has a longitudinally extending back edge 22 and a plurality of cutting teeth 23 spaced along the opposite cutting edge 24. As shown in FIG. 1 the saw blade member 21 is formed so as to have a generally uniform dimension X extending between the opposed edges 22 and 24.

The opposed ends 25 and 26 define, respectively, a leading end and a trailing end for the saw blade 20.

Figure 7:
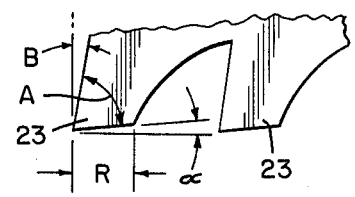
FIG. 7 is an enlarged detail view of a saw teeth utilized in the blade construction of FIGS. 1, 3, and 6.

As best seen in FIG. 7, each tooth 23 is formed with an included angle A ranging between 35° to 70°. The included angle of 35° to 70° enables the respective teeth to be formed with a relatively wide root R. The bottom edge of the tooth tapers upwardly to define a clearance angle $\alpha$. The respective teeth are raked at an angle B. In the illustrated embodiment the clearance angle $\alpha$ and rake angle B may be varied to vary the geometric of the teeth. With angle A varying between the range of 35° to 70°, the sum of angle $\alpha$ and B range between 5° to 55° accordingly. The geometry of the described teeth, as best seen in FIG. 7, enables the tooth to have a relatively wide root R which greatly strengthens the teeth, and which in turn results in a longer tooth life.

Figure 2:
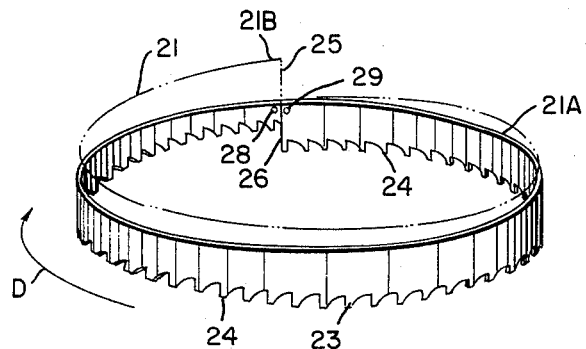
FIG. 2 is a perspective view showing an intermediate step in the method of constructing an endless saw blade embodying this invention.

As shown in FIG. 3, the endless saw blade 20 is formed so that the respective teeth 23 are progressively disposed from the leading end 25 to the trailing end 26 of the saw blade so as to render the respective teeth 23 self-feeding during a cutting operaton. In accordance with the showing of FIGS. 1 to 3, this is attained by disposing the leading and trailing end portions 25 and 26 into offset, abutting relationship. This is best seen in FIG. 2. With the leading and trailing end portions 25 and 26 so disposed, they are then secured by welding, brazing or the like. Thus it will be apparent that the offsetting of the respective end portions 25 and 26 causes the cutting edge 24 to diverge or taper outwardly from the leading end 25 to the trailing end 26, as best seen in FIG. 3. It will thus be apparent that as the endless cutting blade 20 is rotated in a clockwise direction as indicated by arrow D, that the respective teeth will be rendered self-feeding.

To render the back edge 21A of the finished blade 20, as seen in FIG. 3, coincidental to a common plane, the excess or the portion 21B of the blade extending above the top edge 21A of the trailing end portion, as indicated by the dotted line showing in FIG. 2 is removed, as by grinding, cutting or the like. By so doing, the resulting back edge 21A, as shown in FIG. 3, is rendered coincidental to a common plane. When the blade 20 as shown in FIG. 3 is applied to a conventional sawing machine, it will be apparent that the pressure rollers (not shown) will be disposed in bearing relationship with the back edge 21A of the blade in the same manner as heretofore known with a conventional blade. However, with the saw blade 20 described, the amount of pressure heretofore required to be imposed on a saw blade is substantially reduced since the cutting teeth 23 are rendered self-feeding. Also the arrangement is such that the speed of cutting resulting from the described blade 20 can be greatly enhanced. Because a sawing operation can be effected by placing less pressure on the saw blade, the present construction greatly minimizes any tendency of the blade to distort or twist during a cutting operation. As a result a more accurate cut is rendered possible with the described blade construction 20. Also a quicker and more accurate cut is achieved by the described blade 20.

Figure 5:
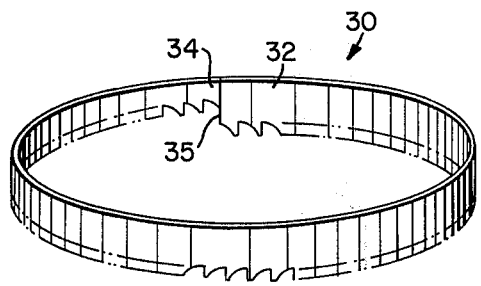
FIG. 5 is a perspective view of an endless saw blade formed from the saw blank of FIG. 4.
Figure 4:
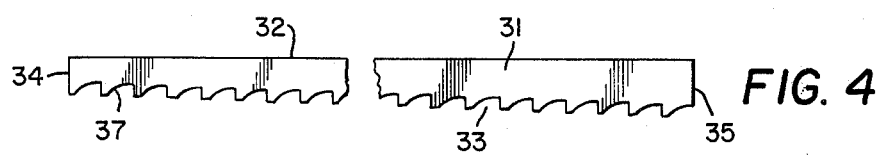
FIG. 4 is a modified saw blade blank.

FIGS. 4 and 5 illustrate another form of the invention. In this embodiment the endless saw blade 30 is formed of an elongated member 31 which has a back edge 32 and a cutting edge 33 which tapers in a diverging direction from the leading end 34 to trailing end 35. Spaced along the cutting edge are a series of saw teeth 37 which are similar in construction as hereinbefore described with respect to FIG. 7.

The endless blade 30 of FIG. 5 is formed by disposing the leading end 34 into abutting relationship with the trailing end 35 so that the back edge 32 lie in a common plane. Thus it will be noted that the tapered edge 33 will render the teeth formed thereby to be progressively disposed so as to render the respective teeth 37 self-feeding when the end blade 30 is placed in operation.

Figure 6:
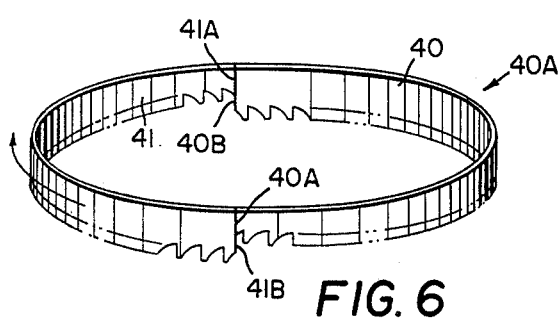
FIG. 6 is another modified endless saw blade construction.

FIG. 6 illustrates another modified form of the invention. In this form of the invention a plurality of similar constructed blade sections 40 and 41 having respective leading and trailing end portios 40A, 40B and 41A, 41B are serially connected into abutting end to end relationship. While the illustrated embodiment of FIG. 6 discloses only two blade sections 40 and 41 connected in end to end relationship, it will be understood that three or more blade sections may be so connected. By stepping the cutting teeth of the respective sections 40 and 41, the speed of cutting can be enhanced. It will be understood that the teeth formed in blade sections 40 and 41 are similar to that described with respect to FIG. 7.

While the saw blade member 21, 31, 40 and 41 are shown to define an endless blade 20, 30 and 40A, it will be understood that the respective blade members may be used as a reciprocating straight saw blade.

The blade construction 21 can be readily utilized as a hack saw wherein the self-feeding effect can be achieved by locating end holes 28 and 29 adjacent the ends of the blade whereby it can be secured to a hack saw handle. It will be noted that hole 29 is disposed at a point above the location of hole 28. The off-setting of holes 28 and 29 when secured to a saw blade handle will progressively dispose the respective teeth 23 so that they are rendered self-feeding during a cutting operation.

From the foregoing, it will be noted that the described blade constructions can be readily utilized either as a straight blade having progressively disposed self-feeding teeth or can be used as an endless blade having progressively disposed self-feeding teeth; or as seen in FIG. 6 having a series of stepped blade portions, each portion having progressively disposed self-feeding teeth. It will be noted that the embodiment of FIG. 6 can be formed by either the methods described with respect to FIGS. 4 and 5.

While the present invention has been described with respect to several embodiments thereof, it will be understood and appreciated that variations and modifications may be made without departing from the spirit or scope of the invention.

What is claimed is:

1. A method of forming an endless band saw blade comprising the setps of:
   forming a saw blade so as to place the opposed ends of the blade into abutting relationship,
   offsetting the abutted ends with respect to one another,
   and securing the abutted ends together in said offset relationship.

2. The method as defined in claim 1 and including the steps of:
   shaping the back edge of the blade to define a back edge which is coincidental to a common plane.

3. A method of forming an endless saw blade comprising the steps of:
   joining together in end to end relationship a plurality of saw blade segments having a series of cutting teeth formed along one edge thereof whereby the adjacent end of successive saw blade segments are in offset relationship,
   securing the abutted adjacent ends to one another in said offset relationship,
   and forming the back edge of the respective saw blade segments so as to define a back edge which is coincidental to a common plane.

4. The method as defined in claim 3 wherein the cutting teeth are formed as to be progressively disposed at an angle to the said back edge.

5. The method as defined in claim 2 wherein said saw blade has its cutting teeth progressively sloped so that each tooth effects a progressive cut when the blade is placed in use.

6. A method of forming a saw blade comprising the steps of:
   forming a saw blade with a plurality of cutting teeth,
   offsetting sections of said saw blade with respect to one another, and
   shaping the back edge of the blade to define a back edge which is coincidental to a common plane, and whereby the cutting teeth of the respective sections are progressively sloped with respect to said back edge.

7. The method as defined in claim 6 and including the step of forming each tooth with a clearance angle.

8. The method as defined in claim 6 wherein the respective teeth are progressively sloped in a diverging manner relative to the direction of cutting so that each succeeding tooth makes a progressively deeper cut in a work piece during a cutting operation.

* * * * *